(12) United States Patent
Masuichi et al.

(10) Patent No.: US 6,321,189 B1
(45) Date of Patent: Nov. 20, 2001

(54) CROSS-LINGUAL RETRIEVAL SYSTEM AND METHOD THAT UTILIZES STORED PAIR DATA IN A VECTOR SPACE MODEL TO PROCESS QUERIES

(75) Inventors: Hiroshi Masuichi; Hiroshi Umemoto; Masakazu Tateno, all of Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/343,543

(22) Filed: Jun. 30, 1999

(30) Foreign Application Priority Data

Jul. 2, 1998 (JP) ................................. 10-202788

(51) Int. Cl.[7] .............................. G06F 17/28; G06F 17/30
(52) U.S. Cl. ...................... 704/7; 704/8; 707/5; 707/536
(58) Field of Search ................................... 704/2, 3, 4, 5, 704/6, 7, 8, 9, 10; 707/530, 531, 532, 536, 1, 2, 3, 4, 5, 6

(56) References Cited

U.S. PATENT DOCUMENTS

| | | | |
|---|---|---|---|
| 5,278,980 | * 1/1994 | Pedersen et al. | 707/4 |
| 5,677,835 | * 10/1997 | Carbonell et al. | 704/8 |
| 5,835,912 | * 11/1998 | Pet | 707/104 |
| 5,905,980 | * 5/1999 | Masuichi et al. | 707/1 |
| 5,963,940 | * 10/1999 | Liddy et al. | 707/5 |
| 6,006,221 | * 12/1999 | Liddy et al. | 707/5 |
| 6,064,951 | * 5/2000 | Park et al. | 704/8 |
| 6,076,086 | * 6/2000 | Masuichi et al. | 707/3 |

FOREIGN PATENT DOCUMENTS

A-9-50435 2/1997 (JP) .

OTHER PUBLICATIONS

Masahiko et al., "Bilingual Text Alignment Using Statistical and Dictionary Information", Information Processing Society of Japan, SIG Notes, 96–NL–112, pp. 23–30, 1996.
Ellis, David: "Information Retrieval (a Japanese translation of 'New Horizons in Information Retrieval')", pp. 53–57, 1990.*
Omhori, et al: "Automated Formation of Bilingual Dictionary Using Statistical Information", Proceeding of the Second Annual Meeting of the Association for Natural Language Processing, pp. 49–52, 1996.*

* cited by examiner

*Primary Examiner*—Joseph Thomas
(74) *Attorney, Agent, or Firm*—Oliff & Berridge, PLC

(57) ABSTRACT

The cross-lingual retrieval system of the present invention retrieves second language sentences which are appropriate translations of a query written in a first language using pair data without being greatly influenced by the difference in expression between the query and sentences to be the object of retrieval, length of the query or sentences to be the object of retrieval or the like. In the system, a pair data storing unit stores multiple pairs each having a first language sentence and a second language sentence having the same meaning. As a query receiving unit receives a query written in the first language, a first retrieving unit retrieves first language sentences similar to the query from a set of first language sentences stored in the pair data storing unit. A second retrieving unit then retrieves second language sentences similar to second language sentences paired with the respective first language sentences retrieved by the first retrieving unit from a set of second language sentences stored in the pair data storing unit. That is, a first retrieval of first language sentences from the pair data is performed based on a query, and then a second retrieval of second language sentences from the pair data is performed based on the result of the first retrieval.

16 Claims, 6 Drawing Sheets

FIG.3

| PAIR DATA IDENTIFIER | JAPANESE | ENGLISH |
|---|---|---|
| 1 | 計算はそろばんで玉を動かして行われる。 | Computations are performed on the abacus by manipulating the counters on it. |
| 2 | 私はどうでもいいという気持ちに取りつかれた。 | I possessed by a spirit of abandon. |
| 3 | 捜索は完全に打ち切られた。 | The search was completely abandoned. |
| 4 | 平然と子供を見捨てた。 | He coolly abandoned his child. |
| ... | ... | ... |

FIG.4

| PAIR DATA IDENTIFIER | JAPANESE | ENGLISH |
|---|---|---|
| 1 | 計算、そろばん、玉、動かす、行う | Computation, perform, abacus, manipulate, counter |
| 2 | 私、どう、いい、気持ち、取りつかれる | I, possess, spirit, abandon |
| 3 | 捜索、完全、打ち切られる | search, completely, abandon |
| 4 | 平然、子供、見捨てる | He, coolly, abandon, child |
| ... | ... | ... |

FIG.6

| | |
|---|---|
| Clouds blanketed the sky.<br>（雲が空をおおっていた） | [9/360,000] |
| The sky was heavily blanketed with clouds.<br>（空は雲で一面厚くおおわれていた） | [10/360,000] |
| The clouds darkened the sky.<br>（雲が空を暗くした） | [13/360,000] |
| The sky darkened with thunder clouds.<br>（空は雷雲で暗くなった） | [14/360,000] |
| The sky is darkened with clouds.<br>（雲が出て空が暗くなっている） | [15/360,000] |
| The sky is blotted out by clouds.<br>（空は雲で一面おおわれている） | [18/360,000] |
| The sky is blotted out by clouds.<br>（雲に隠されて空がまるで見えない） | [19/360,000] |

FIG.7

| | |
|---|---|
| He buried himself in anonymity.<br>（匿名に身を隠した） | [5/360,000] |
| preserve [keep, maintain] one's anonymity<br>（名を伏せておく） | [7/360,000] |
| She preferred to veil her identity.<br>（本名を隠すほうを好んだ） | [8/360,000] |
| Name withheld by Request<br>（希望により匿名、匿名希望） | [13/360,000] |
| He asked for his name to be withheld.<br>（自分の名を公にしてくれるなと言った） | [15/360,000] |

FIG.8

| JAPANESE (ROUGH MEANING IN ENGLISH) | RELATED ART 1 | PRESENT INVENTION |
|---|---|---|
| 特許に抵触する。(infringe the patent) | 1 | 2 |
| 彼は言い訳が上手だ。(He is good at excuse.) | 0 | 3 |
| 目に異物が入る。(have a foreign body in one's eye) | 4 | 3 |
| お手紙の返事が遅くなりまして申し訳ございません。(I apologize for the delay in replying to your letter.) | 5 | 6 |
| 金のない乞食。(a beggar with no money) | 0 | 1 |
| ざわめきが大きくなった。(A murmur swelled.) | 1 | 3 |
| そそっかしくて失敗した。(I failed because of carelessness.) | 0 | 2 |
| よぼよぼのお年寄り。(a doddery old man) | 1 | 1 |
| 劇が開演する。(The play begins.) | 0 | 3 |
| クリスマスシーズンがやって来た。(The Christmas season has come.) | 0 | 3 |
| 前衛的な芸術作品。(an avant-garde literary work) | 0 | 4 |
| ニックネームをつける。(give [sb] a nickname) | 1 | 4 |
| ホルモン剤で治療する。(have a treatment with hormones) | 0 | 1 |
| 雲が立ち込めてきた。(Clouds formed in the sky.) | 0 | 7 |
| 香料が発散する。(exude a perfume) | 1 | 3 |
| 展覧会のオープニング。(the opening of the exhibition) | 1 | 4 |
| リサイタルでデビューする。(make one's debut at a recital) | 0 | 1 |
| 言論の自由を弾圧する。(suppress freedom of speech) | 1 | 3 |
| 哀れっぽい鳴き声。(plaintive call) | 2 | 4 |
| 鋭いウィットがある。(have a sharp wit) | 2 | 8 |
| TOTAL | 20 | 66 |

CROSS-LINGUAL RETRIEVAL SYSTEM AND METHOD THAT UTILIZES STORED PAIR DATA IN A VECTOR SPACE MODEL TO PROCESS QUERIES

BACKGROUND OF THE INVENTION

1. Field of the Invention

The present invention relates to a cross-lingual retrieval system for executing retrieval between a first language and a second language, in particular, relates to a cross-lingual retrieval system that uses a set of pairs each having a first language sentence and a second language having the same meaning (hereinafter, each pair is referred to as a pair data) to retrieve first language sentences according to a query written in the first language and then perform similar sentence retrieval of second language sentences which are similar to second language sentences paired with the retrieved first language sentences.

2. Discussion of the Related Art

With the improvement of the performance of computers, development of electronic dictionaries and progress of technology in natural language processing, many machine translation techniques have been proposed.

However, a machine translation system with a translation capability of sufficient accuracy has not yet been realized.

[Related Art 1]

In a proposed system, a large number of sentence pairs each having an original language (first language) sentence and a sentence translated from the original language into another language (second language) are prepared. A first language sentence is input to the system and similar sentences are retrieved from the first language sentences in the sentence pairs. Based on the retrieved first language sentences, corresponding second language sentences are then retrieved from the sentence pairs. A user can refer to the second language sentences output from the system and can improve a quality of translation from the first language sentence into the second language sentence.

For obtaining sentences similar to the first language sentence input to the system from the set of first language sentences in the sentence pairs, a method of determining a sentence of high similarity based on the number of words commonly included in the input sentence and sentences to be retrieved has been suggested. Also, Japanese Patent Application Laid-Open No. 9-50435 (1997) discloses a method of determining a first language sentence having a vector close to the vector corresponding to the input first language sentence as the sentence of high similarity based on the vector space model, one of the similar document retrieving methods.

A method of obtaining a sentence having high similarity to an input sentence according to the vector space model, described in "Information Retrieval (a Japanese translation of "New Horizons in Information Retrieval")", David Ellis, 1990, pp. 53–57, is now explained.

In the vector space model, each of the sentence to be an objet of retrieval and the sentence input as a query is represented as a vector. Suppose that there are N sentences to be the object of retrieval and M kinds of words (W1, W2, ..., WM) in the N sentences. Then vectors corresponding to each of the N sentences (S1, S2, ..., SN) are defined as M-dimensional vectors as shown in the following expression (1). If a word Wj exists in a sentence Si, Tij is 1. If the word Wj does not exist in the sentence Si, Tij is 0.

$$S1=(T11, T12, \ldots, T1M), S2=(T21, T22, \ldots, T2M), SN=(TN1, TN2, \ldots, TNM) \quad (1)$$

In a similar way, the vector corresponding to a query Q is defined as shown in the following expression (2). If a word Wi exists in the query Q, Ti is 1. If the word Wi does not exist in the query Q, Ti is 0. Here, it is assumed that each element of the vector takes 1 or 0, namely, a binary value. However, it may be possible to allot a real numeric value to each element in accordance with a degree of importance of the word in the sentence.

$$Q=(T1, T2, \ldots, TM) \quad (2)$$

In the vector space model, a sentence Si corresponding to the vector Si which has a close distance to the vector Q is determined to be the sentence having a high similarity to the query Q. Sentences are output in order of descending degree of importance as a result of retrieval. The distance D (Q, Si) between the vector Q and the vector Si is calculated in accordance with the following expression (3). Here, an expression (V, U) represents an inner product of a vector V and a vector U.

In the vector space model, ordinary, the words W1, W2, ..., WM used for calculation are limited to content words. Function words such as postpositional particles (a part-of-speech in Japanese grammar) and auxiliary verbs are not taken into account. Moreover, a general word such as verb "be" in English (namely, a stop word) is not taken into account though it is the content word.

$$D(Q, Si)=(Q, Si)/((Q, Q)(Si, Si))^{1/2} \quad (3)$$

[Related Art 2]

To obtain the same effect as the above-described [Related Art 1], a method of improving the translation quality has been suggested. In the method, each word in a query written in a first language is automatically converted into a word or a phrase of a second language by using a dictionary, and then a corresponding sentence(s) is retrieved from a set of the second language sentences utilizing the set of converted words or phrases of the second language. Thereby the user can refer to the corresponding second language sentence(s).

However, the above-described [Related Art 1] and [Related Art 2] have problems as follows.

The above-described [Related Art 1] obtains a similar first language sentence(s) based only on the words contained in the query of the first language. Therefore, although a second language sentence adequate as a translation of the query of the first language is present in the set of second language sentences, it cannot be obtained as a result of the retrieval if the expression of the corresponding first language sentence in the sentence pairs differs from that of the query. The [Related Art 1] is effective only if the sentence pairs contain a sentence composed of a set of words which are the same as those contained in the query of the first language.

The inadequacy becomes more pronounced as the number of the words contained in the query becomes smaller. Consequently, in the case where a document including a large number of sentences is input, non-zero elements of the corresponding document vector are increased (dimension of the vector is substantially raised), and accordingly, a highly reliable retrieving result is available. However, in most cases, actual translation data consists of short sentences, and therefore it is practically impossible to obtain adequate translations by the [Related Art 1].

As an example, a case is considered in which the first language is Japanese, the second language is English, and a Japanese sentence "次第細いなる。" (having much the same sense as "It is gradually tapered.") is input. The content words extacted from the sentence are "次第" (gradually) and "細い" (tapered). The verb "なる" (be (not absolutely precise)) is the stop word and is eliminated from the following explanation.

According to [Related Art 1], Japanese sentences containing both "次第" and "細い" are obtained as sentences similar to the above query. However, it is impossible to obtain the sentences acceptable as adequate translations, having different expressions (using different words) but the same meaning as the query, such as the following examples (a) and (b).

"It tapers down to a point". (a)

"It tapers into a sharp point". (b)

The above-described [Related Art 2] obtains second language sentences to be referred to by converting each word in the query of the first language into a word or phrase of the second language by utilizing the dictionary.

However, a word of the first language can be expressed by a variety of words or phrases of the second language. Further, selection of the second language word adequate to substitute for the first language word depends on the context of the query of the first language and it is practically impossible to determine the words to be selected for substitution beforehand. Consequently, it is difficult to show the exhaustive information about correspondences between the first language words and the second language words in a dictionary. To obtain an adequate translation is thus difficult by utilizing the [Related Art 2].

As an example, under the same condition as the above example of [Related Art 1], "次第" and "細い" are converted into the English words or phrases (c) and (d), respectively, as follows.

"次第"→"gradually, by degrees, little by little, as soon as, order, the state of things, depends on" (c)

"細い"→"thin, narrow, fine, slim, slender" (d)

The proper English sentence shown as (a) or (b) cannot be obtained by an attempt to retrieve the sentence containing any word shown in (c) and (d). In fact, if an English sentence corresponding to "次第細いなる。" is composed of the words in (c) and (d), an unnatural sentence is generated. The word "taper" contained in the English sentences (a) and (b) means "It gradually thins (or it gradually narrows)". or "It decreases (or it is gradually reduced)" by itself. In [Related Art 2], the sentences (a) or (b) cannot be obtained unless "taper" is regarded as a translation of "次第" or "細い".

However, "taper" includes meanings of both "gradually" and "thin (narrow, decrease or be reduced)", and it is inadequate as a translation of only "次第" or "細い". Like "taper", various English words, such as "peter", "wane" and "fade", include the meaning of "gradually" by itself. These words are inadequate as a translation of a single word "次第" by the same reason as "taper". This means that an English word properly corresponding to a Japanese word is determined depending upon the context of the query, and therefore it is impossible to prepare a dictionary in advance.

In the method disclosed by the above-described Japanese Patent Application Laid-Open No. 9-50435 using the vector space model, a vector is provided not to each sentence, but to each word in advance, and a sentence vector is represented as a sum total of vectors corresponding to respective words contained in the sentence.

In this case, if the same words do not exist in the query and a sentence to be the object of retrieval, the similarity is lowered and the problem of [Related Art 1] is not removed by the method. Further, as described above, the meaning of each word is determined depending upon the context of the query and it is impossible to determine a fixed vector for each word in advance. Accordingly, the method has same problem as [Related Art 2].

SUMMARY OF THE INVENTION

The present invention has been made in view of the above circumstances and provides a cross-lingual retrieval system for retrieving second language sentences which are adequate translations of query written in a first language by using a set of pair data without ill effects caused by different expression or the number of words or phrases contained in the query.

The present invention in particular provides a cross-lingual retrieval system capable of retrieving second language sentences from the set of pair data even if the query written in the first language is relatively short.

Additional advantages of the invention will be set forth in part in the description which follows and in part will be obvious from the description, or may be learned by practice of the invention.

The cross-lingual retrieval system according to the present invention stores multiple pairs each having a first language sentence and a second language sentence having the same meaning in a pair data storing unit. When query written in the first language is received by a query receiving unit, a first retrieval unit performs retrieval of sentences similar to the query from a set of first language sentences stored in the pair data storing unit. A second retrieval unit then performs retrieval of second language sentences similar to second language sentences having the same meaning and paired with the retrieved first language sentences from the set of the second language sentences stored in the pair data storing unit.

In other words, retrieval based on a first language sentence is performed in the set of pair data, and based on the second language sentences paired with the retrieved first language sentences, the retrieval of similar second language sentences is performed in the set of pair data. The successive retrieval for the first and second languages using the set of pair data as a bridge makes it possible to retrieve second language sentences which are adequate translation of the query written in the first language without being greatly influenced by difference in expression between the query and each sentence to be the object of retrieval or the number of words or phrases contained in the query.

The set of first language sentences and the set of second language sentences included in the pair data contain not only the sentence data stored in the pair data storing unit or sentence storing unit but also words and phrases extracted from the sentence data or a set of sentences associated with the sentence data, which can be treated substantially the same as the sentence data stored in the pair data storing unit or the sentence storing unit in the retrieving process.

In another aspect of the cross-lingual retrieval system of the present invention, multiple pairs having the first language sentence and the second language sentence having the same meaning (a second language translation of the first language sentence) and paired therewith are stored in the pair data storing unit, and further, more second language sentences are stored in the sentence storing unit. When the query receiving unit receives the query written in the first language, the first retrieving unit performs retrieval of sentences similar to the query from the set of first language sentences stored in the pair data storing unit. The second retrieving unit then retrieves second language sentences similar to second language sentences having the same meaning and paired with the retrieved first language sentence, namely, translations of the first language sentences, from the set of second language sentences stored in the pair data storing unit and those stored in the sentence storing unit.

In other words, retrieval based on the first language sentence is performed in the set of pair data, and based on the second language sentences paired with the retrieved first language sentences, the retrieval of similar second language sentences is performed in the set of pair data and another set of second language sentences. The successive retrieval for the first and second languages using the set of pair data as a bridge makes it possible to retrieve second language sentences which are adequate translations of the query written in the first language without being greatly influenced by difference in expression between the query and each sentence to be the object of retrieval or the number of words or phrases contained in the query.

According to the aspect of the system, an external database of various sentences, for example, can be utilized in similar sentence retrieval by the second retrieving unit in addition to the set of pair data. Thereby, more adequate second language translations are available by using more extensive data.

In another aspect of the cross-lingual retrieval system according to the present invention, multiple pairs each having the first language sentence and the second language sentence having the same meaning (a second language translation of the first language sentence) and paired therewith are stored in the pair data storing unit, and further, more second language sentences are stored in the sentence storing unit. When the query receiving unit receives the query written in the first language, the first retrieving unit retrieves sentences similar to the query from the set of first language sentences stored in the pair data storing unit. The second retrieving unit then retrieves second language sentences similar to second language sentences having the same meaning and paired with the retrieved first language sentences from the set of second language sentences stored in the sentence storing unit.

In other words, retrieval based on a first language sentence is performed in the set of pair data, and based on the second language sentences paired with the retrieved first language sentences, the retrieval of similar second language sentences is then performed in another, different set of second language sentences. The successive retrieval for the first and second languages using the set of pair data as a bridge is performed to make it possible to retrieve second language sentences which are adequate translations of the query written in the first language without being greatly influenced by difference in expression between the query and each sentence to be the object of retrieval or the number of words or phrases contained in the query.

According to the aspect of the system, an external database of various sentences, for example, can be utilized in similar sentence retrieval by the second retrieving unit. Thereby, more adequate second language translations are available by using various kinds of data.

Any of the above aspects of the cross-lingual retrieval system of the present invention can employ various modes, for example, as follows.

a) An important word or its degree of importance is utilized in retrieval by the second retrieving unit.

b) The vector space model is utilized in retrieval by the second retrieving unit.

c) A pair data having a first language sentence and a second language sentence which is similar to another pair data is retrieved by the second retrieving unit.

d) A query written in the first language is divided into words or phrases and similar sentence retrieval is performed for each of the words or phrases.

Details of the Above Modes are Described Later

A method of cross-lingual retrieval according to the present invention can retrieve second language sentences which are adequate translations of query written in the first language by firstly retrieving sentences similar to the query written in the first language using the pair data as described above, and then secondly retrieving sentences similar to second language sentences having the same meaning and paired with the retrieved first language sentences using the pair data and/or a different set of second language sentences.

The present invention can also be embodied as a storage medium that stores a program for making a computer execute the above method of retrieval. That is, the translation retrieving program, that makes the computer execute a function for receiving a query written in the first language, a function for performing the first retrieval of sentences similar to the query from a set of first language sentences using the multiple pair data each having a first language sentence and a second language sentence having the same meaning and paired therewith, a function for performing the second retrieval of sentences similar to second language sentences paired with the first language sentences retrieved by the first retrieval from the set of second language sentences in the pair data (and/or another set of second language sentences), is stored in a computer-readable storage medium such as a CD-ROM.

With the above-described storage medium, pair data stored in the built-in memory of the computer or an external database may be used. It is also possible to store the pair data in the storage medium together with the above retrieval program. In this case, the retrieval program stored in the storage medium includes a function for reading the pair data from the storage medium and storing it in the built-in memory of the computer.

BRIEF DESCRIPTION OF THE DRAWINGS

Preferred embodiments of a cross-lingual retrieval system according to the present invention are now described in detail based on the drawings.

FIG. 3 shows an example of pair data;

FIG. 4 shows an example of a result of morphological analysis of the pair data;

FIG. 6 shows a result of the retrieval by the embodiment of the cross-lingual retrieval system according to the present invention;

FIG. 7 shows another example of the result of the retrieval by the embodiment of the cross-lingual retrieval system according to the present invention; and FIG. 8 shows results of the retrieval by a conventional art and the embodiment of the cross-lingual retrieval system according to the present invention.

DETAILED DESCRIPTION OF THE PREFERRED EMBODIMENT

Figure 1:
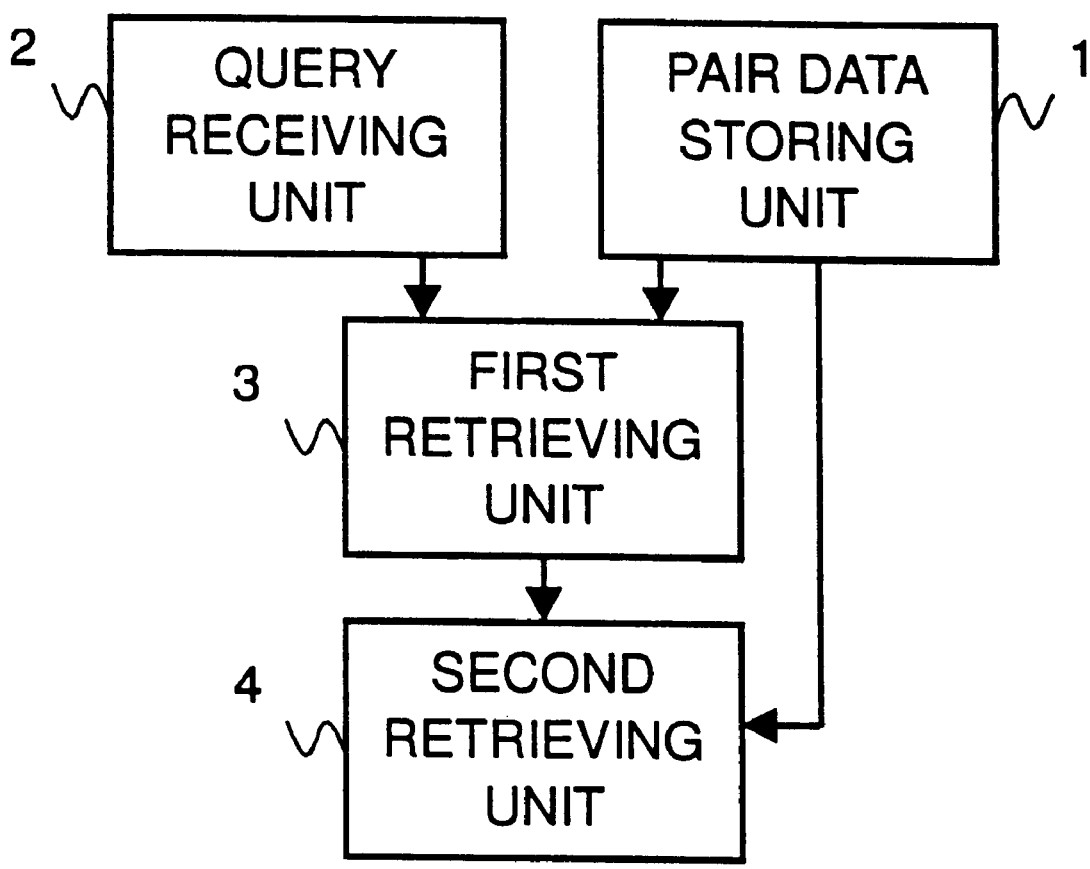
FIG. 1 shows a typical configuration of a cross-lingual retrieval system according to the present invention.

A typical configuration of the cross-lingual retrieval system according to the present invention is as shown in FIG. 1.

The system has a pair data storing unit 1, a query receiving unit 2, a first retrieving unit 3 and a second retrieving unit 4. The pair data storing unit 1 stores multiple pairs each having a first language sentence and a second language sentence having the same meaning and paired therewith. The query receiving unit 2 receives a query written in the first language. The first retrieving unit 3 retrieves first language sentences similar to the received query from the set of first language sentences stored in the pair data storing unit 1. The second retrieving unit 4 retrieves second language sentences similar to second language sentences having the same meaning and paired with the respective first language sentences retrieved by the first retrieving unit 3 from the set of second language sentences stored in the pair data storing unit 1.

The similar sentence retrieval by the first retrieving unit 3 is performed, for example, after extracting content words from the query written in the first language, by (1) selecting first language sentences having a similarity higher than a predetermined threshold from among similar first language sentences obtained using the vector space model based on a set of the extracted content words or (2) selecting first language sentences having a value of sum of extended mutual information (described later) larger than a predetermined threshold from among similar first language sentences obtained by computation using the extended mutual information, as a result of the retrieval.

According to the first language sentences retrieved by the first retrieving unit 3 from the set of first language sentences, second language sentences having the same meaning and paired therewith stored in the pair data storing unit 1 are obtained and input to the second retrieving unit 4.

The similar sentence retrieval by the second retrieving unit 4 is performed, for example, after extracting content words from the second language sentences obtained as described above, by (1) selecting second language sentences having a similarity higher than a predetermined threshold from among similar second language sentences obtained using the vector space model based on a set of the extracted content words or (2) selecting second language sentences having a value of sum of extended mutual information larger than a predetermined threshold from among similar second language sentences obtained by computation using the extended mutual information as a result of the retrieval.

If multiple sentences are input for utilizing the vector space model, sum of the sentence vectors corresponding to the respective input sentences is regarded as an input sentence vector and thereby the computation may be carried out in the same way as a single sentence is input.

The retrieval by the first retrieving unit 3 is performed to obtain a wide variety of sentences similar to the received query. Both similar sentence retrievals utilizing the vector space model and computation of the extended mutual information are based upon a statistical method, and accordingly, the result of retrieval becomes more reliable when the query includes many different kinds of words. Therefore, the aim of the retrieval by the first retrieving unit 3 is to increase the number of sentences to be input to the similar sentence retrieval performed by the second retrieving unit 4 for preventing oversight in the retrieval.

The retrieval performed by the second retrieving unit 4 is the similar sentence retrieval for the second language, which makes it possible to obtain similar second language sentences without being influenced by difference in expression between the first language and second language (without being influenced by incomplete correspondence between the first language words and the second language words).

With combination of the first retrieving unit 3 and the second retrieving unit 4, the problems exist in [Related Art 1] and [Related Art 2] are resolved.

The problem of [Related Art 1] is that first language sentences having the same meaning as the query written in the first language cannot be retrieved if they have expressions different from those of the query (if they have incompletely corresponding words), though they exist in the set of pair data. According to the present invention, if second language sentences highly similar in meaning to the query written in the first language is obtained using a set of pair data as a bridge, they can be a result of retrieval though they contain no same words contained in the query.

The problem of [Related Art 2] is that it is impossible to prepare a dictionary describing exhaustive information about the words of the second language corresponding to a word of the first language in advance. According to the present invention, the first retrieving unit 3 obtains a set of first language sentences having high similarity to the received query written in the first language and then the second retrieving unit 4 retrieves second language sentences similar to second language sentences having the same meaning and paired with the respective first language sentences retrieved by the first retrieving unit 3. Here, the correspondence between the words of the first language and those of the second language is dynamically determined by word information obtained from the vast variety of pair data obtained based on the received query of the first language. That is, exhaustive correspondence between the first language words and the second language words is available without preparing the dictionary of the second language words corresponding to the first language words.

For example, suppose that the Japanese sentence "次第細いなる。" is received under the same condition in the example of [Related Art 1]. The first retrieving unit 3 retrieves Japanese sentences such as "イギリスの援助が次第に減じた。(British aid tapered off.)", "フランスワインの購買が次第に先細りになった。(The purchase of French wine tapered off.)", "彼の筋肉たくましい脚は下に向かってだんだん細くなり、足首はほっそりしていた。(His muscular legs tapered to slender ankles.)" and "彼の言っていることがはっきりわかってくると拍手かっさいが心もとなげに次第に小さくなった。(When they realized what he was saying, the applause tapered off uncertainly.)". Since any of these sentences includes either "次第細い", they are retrieved as similar sentences of Japanese query sentence "次第に細くなる。".

The second retrieving unit 4 performs similar sentence retrieval in a set of English sentences corresponding to the set of respective Japanese sentences retrieved by the first retrieving unit 3. All of the English sentences corresponding to the respective Japanese sentences contain the word "taper". Therefore, the second retrieving unit 4 determines that sentences containing "taper" have high degree of similarity, and the English sentences (a) and (b) described above are obtained as a result of retrieval.

Embodiment

In this embodiment, computation of similarity between the query expression and a word is executed by extending the mutual information, Dice-coefficient or t-score that are originally statistical values used as a similarity between words. Examples of using mutual information, Dice-coefficient or t-score techniques for computation of the degree of similarity between words are described in "Bilingual Text Alignment Using Statistical and Dictionary Information", Haruno and Yamazaki, Information Processing Society of Japan, SIG Notes, 96-NL-112, pp. 23–30, 1996 and "Automated Formation of Bilingual Dictionary Using Statistical Information", Ohmori et al., Proceeding of the Second Annual Meeting of the Association for Natural Language Processing, pp. 49–52, 1996.

The mutual information (MI) between the words, word1 and word2, is defined by the following expression (4). If it is assumed that the number of all the documents to be the object of retrieval is M, the number of documents containing both word1 and word2 is a, the number of documents containing only word1 is b and the number of documents containing only $word_2$ is c, the probabilities of appearance of the words are represented by the following expressions (5).

$$MI(word1, word2) = \log_2\{prob(word1, word2)/[prob(word1)prob(word2)]\} \quad (4)$$

$$prob(word1, word2) = a/M$$

$$prob(word1) = (a+b)/M$$

$$prob(word2) = (a+c)/M \quad (5)$$

In this embodiment, the mutual information (MI') between the query S and a word is defined by the following expression (6). If it is assumed that the number of all the documents to be the object of retrieval is M, the number of documents containing a word "word" and obtained according to the query S is a', the number of documents obtained according to the query S and not containing "word" is b', and the number of documents containing "word" except the documents obtained according to the query S is c', the probabilities of appearance are represented by the following expressions (7).

$$MI'(S, word) = \log_2\{prob(S, word)/prob(S)prob(word)\} \quad (6)$$

$$prob(S, word) = a'/M$$

$$prob(S) = (a'+b')/M$$

$$prob(word) = (a'+c')/M \quad (7)$$

Dice-coefficient (DC) or t-score (TS) can also be used as the statistical value for obtaining the degree of similarity between the words. DC and TS are defined by the following expressions (8) and (9), respectively.

$$DC(word1, word2) = 2prob(word1, word2)/[prob(word1)+prob(word2)] \quad (8)$$

$$TS(word1, word2) = M[prob(word1, word2) - prob(word1)prob(word2)]/[prob(word1)prob(word2)] \quad (9)$$

Similar to the mutual information, it is possible to apply the extension represented by the following expressions (10) and (11) to the Dice-coefficient and t-score for computing the degree of similarity between the query and the word. The degree of similarity between the query S and the word becomes higher as any of the values of MI'(S, word), DC'(S, word) and TS'(S, word) becomes larger.

$$DC'(S, word) = 2prob(S, word)/[prob(S)+prob(word)] \quad (10)$$

$$TS'(S, word) = M[prob(S, word) - prob(S)prob(word)]/[prob(S)prob(word)] \quad (11)$$

In this embodiment, the similarity between the query S and a word (namely, a candidate for an important word having a degree of importance represented by any of the above expressions) is obtained by using one of the extended mutual information (MI'), extended Dice-coefficient (DC') and extended t-score (TS').

The following algorithm [S01]–[S04] using the extended mutual information (MI') is executed in this embodiment of the cross-lingual retrieval system to perform similar sentence retrieval of the query S from a set of sentences D.

[S01] Sentences similar to the query S are retrieved from the set of sentences D. Morphological analysis (process of dividing a sentence into words) is then applied to the set of sentences obtained by the retrieval, and thereby all content words contained in the set of sentences are extracted. The set of obtained content words is represented as W=(w1, w2, . . . , wn).

[S02] The extended mutual information between the query S and each content word in the set of the content words W(MI'(S, w1), MI'(S, w2), . . . , MI'(S, wn)) is obtained by the above expression (6).

[S03] Addition of the value MI'(S, wi) to the sentence containing an element wi of the set of content words W is performed if i satisfies the expression $1 \leq i \leq n$, making all sentences in the set D the object of processing.

[S04] The sentences are output in the descending order of sum of values of MI'(S, wi) as a result of the similar sentence retrieval based on the query S.

The configuration of this embodiment of the cross-lingual retrieval system will be described with reference to FIG. 2.

In this embodiment, the cross-lingual retrieval system is realized by reading the program of cross-lingual retrieval stored in a portable storage medium, such as a CD-ROM, with a reading device of the computer and making the computer execute instructions of the program. The cross-lingual retrieval system according to the present invention can also be realized as a system exclusively executing the functions described as follows.

In this embodiment, it is assumed that the first language is Japanese and the second language is English. However, the system is effective for any language to which the morphological analysis is applicable.

Figure 2:
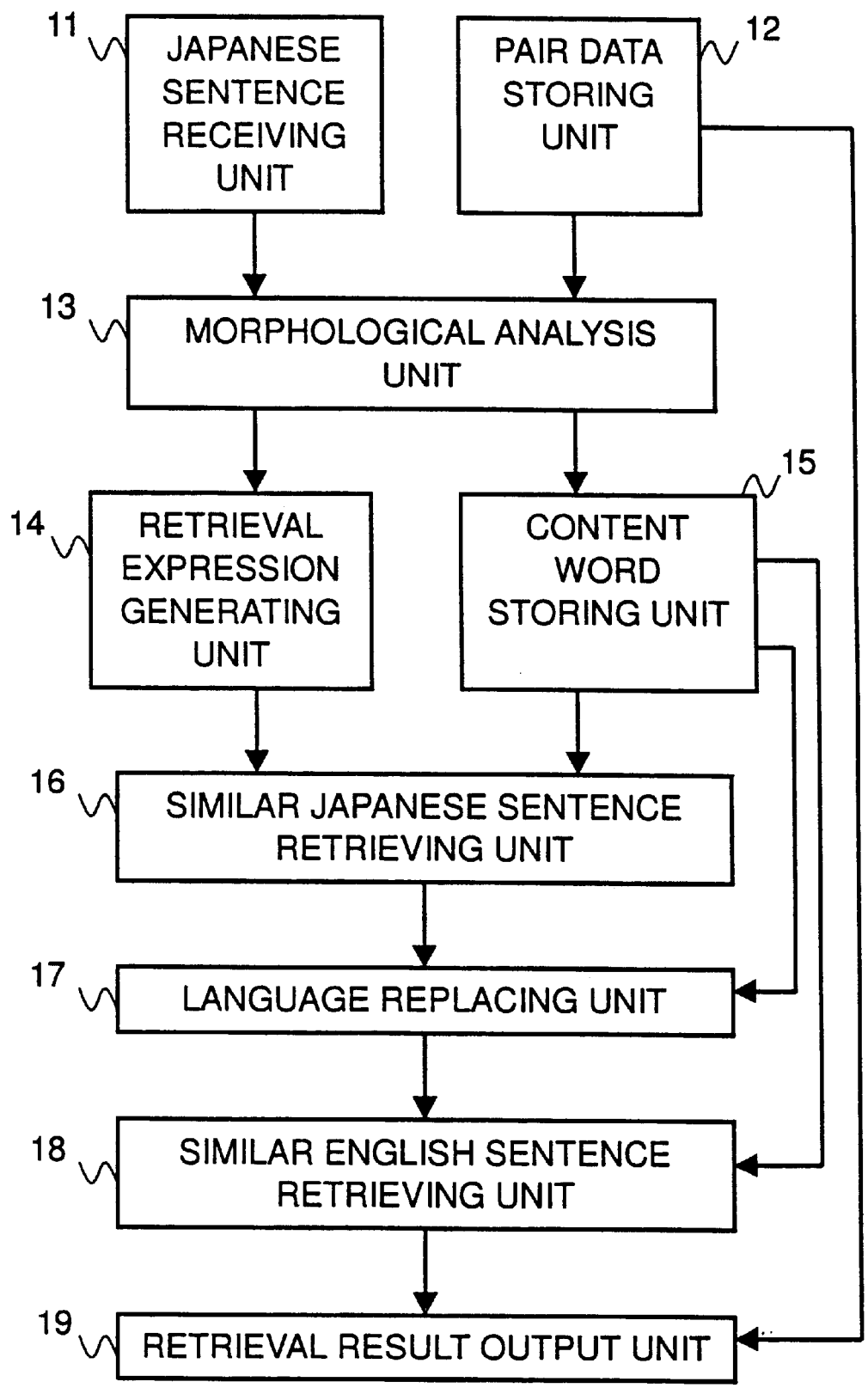
FIG. 2 shows a configuration of an embodiment of the cross-lingual retrieval system according to the present invention.

In FIG. 2, a Japanese sentence receiving unit 11 is a program module having a user interface for receiving a sentence written in Japanese input by a user for obtaining English sentences having similar meaning. The Japanese sentence receiving unit 11 may have a communication interface for receiving the sentence input by a user in a distance through a communication line.

A pair data storing unit 12 is a program module having a memory for storing multiple pairs each having a Japanese sentence and an English sentence having the same meaning (an English translation thereof). In this embodiment, the multiple pair data is stored in the built-in memory of a computer, but the data may be stored in a storage medium together with the program of retrieval and written in the memory of the computer, or the computer may access the storage medium to obtain necessary data. In this embodiment, an identifier (pair data identifier) is assigned to each pair data having a Japanese sentence and an English sentence having the same meaning for identifying it.

A morphological analysis unit 13 is a program module that performs morphological analysis for all sentences stored in the pair data storing unit 12 and the Japanese sentence received by the Japanese sentence receiving unit 11. The morphological analysis unit 13 stores a result of analysis of the sentences in the pair data storing unit 12 in a content word storing unit 15 and transfers a result of analysis of the Japanese sentence received by the Japanese sentence receiving unit 11 to a retrieval expression generating unit 14.

The retrieval expression generating unit 14 is a program module that receives the result of morphological analysis of the Japanese sentence from the morphological analysis unit 13 and extracts the content words (except for the stop words). The retrieval expression generating unit 14 then connects the obtained content words by OR(s) to make a retrieval expression.

The content word storing unit 15 is a program module that receives the result of the morphological analysis for all sentences stored in the pair data storing unit 12 from the morphological analysis unit 13 and extracts the content words (except for the stop words) from the result of the analysis, and stores the content words corresponding to each pair data identifier in a memory.

A similar Japanese sentence retrieving unit 16 is a program module that receives the retrieval expression generated by the retrieval expression generating unit 14 as an input and retrieves pair data identifiers corresponding to Japanese sentences similar to the retrieval expression using Japanese word information stored in the content word storing unit 15. For retrieving the similar Japanese sentences, extended mutual information is used.

A language replacing unit 17 is a program module that obtains all English words in the English sentences corresponding to the respective pair data identifiers retrieved by the similar Japanese sentence retrieving unit 6 from the content word storing unit 15. The language replacing unit 17 connects the obtained English words by OR(s) to generate a retrieval expression.

A similar English sentence retrieving unit 18 is a program module that receives the retrieval expression generated by the language replacing unit 17 as an input and retrieves pair data identifiers of multiple English sentences similar to the retrieval expression using English word information stored in the content word storing unit 15. For retrieving the similar English sentences, extended mutual information is also used.

A retrieval result output unit 19 is a program module that receives the result of retrieval by the similar English sentence retrieving unit 18 and displays it to the user.

FIG. 3 shows an example of pair data stored in the pair data storing unit 12. Each of the pair data consists of a Japanese sentence, an English sentence having the same meaning and a pair data identifier identifying them.

FIG. 4 shows an example of results of the morphological analysis stored in the content word storing unit 15. Japanese content words extracted from the Japanese sentence in the pair data and English content words extracted from the corresponding English sentence in the pair data are identified by the same pair data identifier as the original sentence pair data. That is, the content word pair stored in the content word storing unit 15 and the pair data stored in the pair data storing unit 12 are identified by the same pair data identifier.

In this embodiment, the morphological analysis is applied to all the pair data stored in the pair data storing unit 12 for generating the content word pairs in the content word storing unit 15 in advance of performing the similar sentence retrieval.

Figure 5:
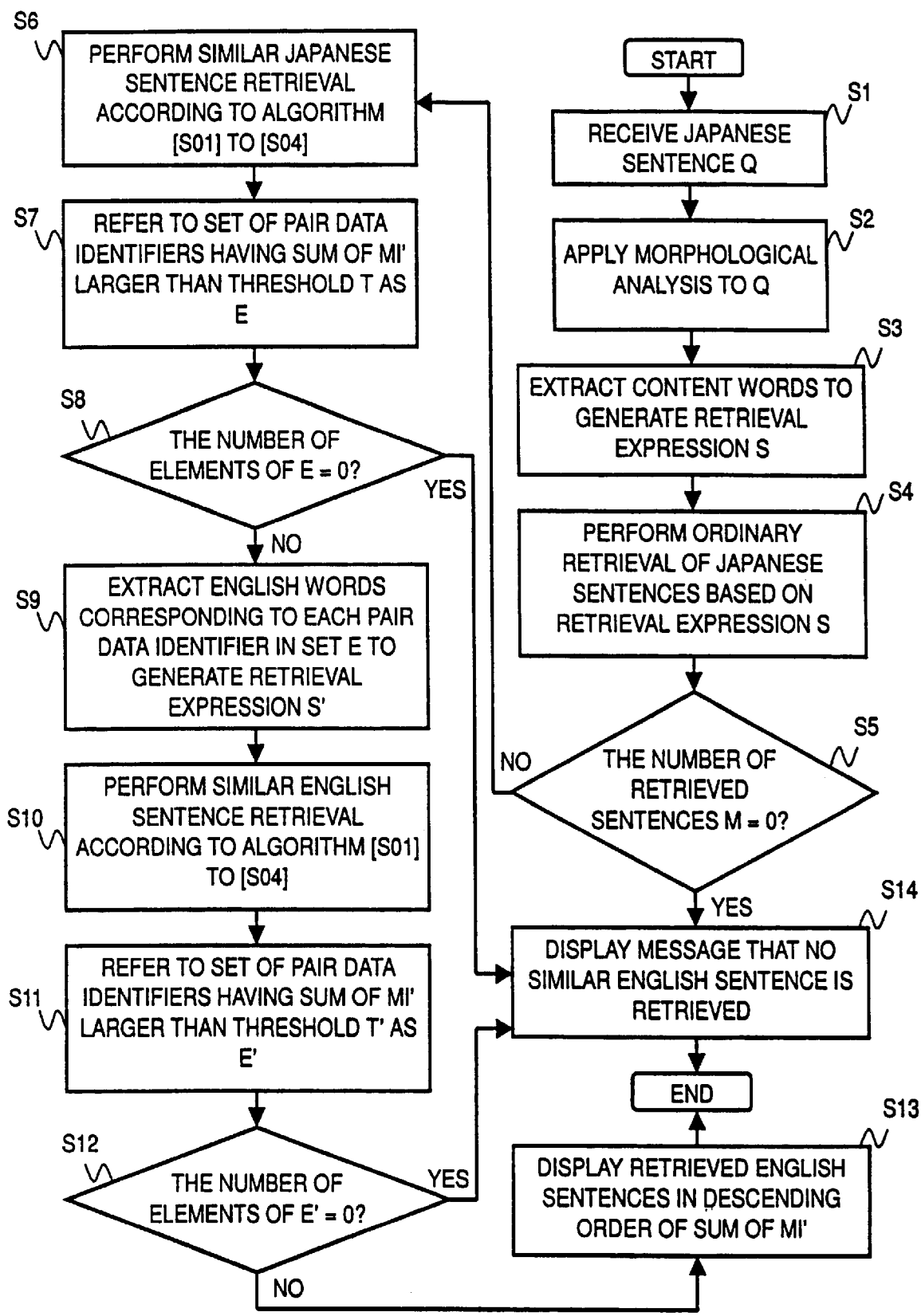
FIG. 5 is a flowchart showing procedures of a retrieving process in the embodiment of the cross-lingual retrieval system according to the present invention.

FIG. 5 shows an algorithm executed by the cross-lingual retrieval system with the above configuration. English sentences similar in meaning to the Japanese sentence input to the Japanese sentence receiving unit 11 are available by executing the algorithm.

(Step S1) The Japanese sentence receiving unit 11 receives an input Japanese sentence Q.

(Step S2) The morphological analysis unit 13 applies the morphological analysis to the Japanese sentence Q to divide it into words and/or phrases.

(Step S3) The retrieval expression generating unit 14 extracts the content words except for the stop words from the words obtained by dividing the Japanese sentence and connects the content words by OR(s) to generate a retrieval expression S.

(Step S4) The similar Japanese sentence retrieving unit 16 receives the retrieval expression S as an input and performs an ordinary retrieval (for example, keyword-matching retrieval) in Japanese sentences in the pair data stored in the pair data storing unit 12. The Japanese sentences containing any word in the retrieval expression S are retrieved. The number of retrieved Japanese sentences is referred to as M.

(Step S5) The similar Japanese sentence retrieving unit 16 determines whether M is 0 or not.

(Step S14) If M is 0, the retrieval result display unit 19 displays a message that no English sentence similar to the received Japanese sentence exists in the retrieval object data, and the process is completed.

In the case where no word in the Japanese sentence Q is contained in the pair data to be the object of retrieval, there is little probability that sentences similar to the Japanese sentence Q exist in the pair data. Therefore, in this embodiment, the ordinary retrieval in Step S4 is performed as a preprocess to avoid subsequent futile similar sentence retrieval.

(Step S6) If M is not 0, the similar Japanese sentence retrieving unit 16 receives the retrieval expression S as an input and performs similar sentence retrieval in the Japanese sentences in the pair data. That is, the set of Japanese sentences in the pair data is referred to as D, the set of content words stored in the content word storing unit 15 is referred to as W, and the above-described algorithm [S01]–[S04] is executed.

(Step S7) The similar Japanese sentence retrieving unit 16 determines the pair data each having the sum of the values of the extended mutual information larger than a threshold T (a predetermined non-negative constant) in the result of the retrieval in Step S6. The set of the pair data identifiers of the determined pair data is referred to as E.

(Step S8) It is determined whether the number of elements of the set E of pair data identifiers is 0 or not.

(Step S9) If the number of elements of the set E is 0, adequate similar sentences are not available, and therefore the process proceeds to Step S14 and is completed. If the number of elements of the set E is not 0, the language replacing unit 17 extracts all English words corresponding to respective pair data identifiers in the set E of pair data identifiers from the content word storing unit 15 and connects the English words by OR(s) to generate a retrieval expression S'.

(Step S10) The similar English sentence retrieving unit 18 receives the retrieval expression S' as an input and performs similar sentence retrieval in the English sentences in the pair data. That is, the set of English sentences in the pair data is referred to as D, the set of content words stored in the content word storing unit 15 is referred to as W, and the above-described algorithm [S01]–[S04] is executed.

(Step S11) The similar English sentence retrieving unit 18 determines the pair data each having the sum of the values of the extended mutual information larger than a threshold T' (a predetermined non-negative constant) in the result of the retrieval in Step S10. The set of the pair data identifiers of the determined pair data is referred to as E'.

(Step S12) It is determined whether the number of elements of the set E' of pair data identifiers is 0 or not.

(Step S13) If the number of elements of the set E' is 0, adequate similar sentences are not available, and therefore the process proceeds to Step S14 and is completed. If the number of elements of the set E' is not 0, the retrieval result output unit 19 displays the English sentences (or pair data) corresponding to the set E' of pair data identifiers in the descending order of sum of values of the extended mutual information as a result of retrieval of the English sentences similar in meaning to the Japanese sentence Q and the process is completed.

In this embodiment, the English sentences in the pair data is made the object of retrieval by the similar English sentence retrieving unit 16 (the second retrieving unit). However, the object of retrieval of the second retrieving unit is not limited to the pair data. A set of English sentences not paired with respective Japanese sentences having the same meaning, or both of the set of English sentences in the pair data and the set of English sentences not paired with the Japanese sentences may also be the object of retrieval. In this case, an English sentence storing unit that stores only English sentences is provided separately to the pair data storing unit 12, and the object of retrieval by the second retrieving unit may be the English sentences in the English sentence storing unit or the English sentences in both of the pair data storing unit 12 and the English sentence storing unit.

Further, in this case, in the algorithm [S01]-[S04] of the similar sentence retrieval in Step S10, the set of documents D may be the English sentences in the English sentence storing unit or the English sentences in the pair data storing unit 12 and the English sentence storing unit, and the set of content words W may be all content words extracted from the English sentences in the English sentence storing unit or all content words extracted from the English sentences in both of the pair data storing unit 12 and the English sentence storing unit.

The similar English sentence retrieving unit 18 may perform similar sentence retrieval not only in the English sentences but also in both of the English sentences and the Japanese sentences as the second retrieving unit. In this case, in Step S9, the language replacing unit 17 extracts both English sentence and Japanese sentence corresponding to each of the pair data identifiers to generate the retrieval expression S'. In Step S10, the pair of English sentence and the Japanese sentence having the same meaning (having the same identifier) may be integrally regarded as a single sentence. Then the set of such pair data may be the set of documents D in the algorithm [S01]-[S04] and all content words extracted from the English sentences and the Japanese sentences which are the object of retrieval may be the set of content words W.

In this embodiment, the similar sentence retrieval is performed using the extended mutual information. The same effect is available if the similar sentence retrieval is performed using the extended t-score, extended Dice-coefficient or vector space model.

Moreover, in this embodiment, the similar Japanese sentence retrieving unit 16 (the first retrieving unit) and the similar English sentence retrieving unit 18 (the second retrieving unit) perform the similar sentence retrieval in accordance with the same algorithm. However, since the purpose of the retrieval by the first retrieving unit is to obtain a vast variety of sentences associated with the retrieval query sentence written in the first language, the result of retrieval performed in Step S4 can be directly input to the similar English sentence retrieving unit 18 instead of the result of retrieval by the similar Japanese sentence retrieving unit 16. The same effect can be obtained. In other words, either similar sentence retrieval or ordinary retrieval (for example, keyword retrieval) can be adopted by the first retrieving unit.

Further, in this embodiment, the sum of values of the extended mutual information (degree of importance) provided to each of the pair data identifiers obtained as a result of the retrieval performed by the similar Japanese sentence retrieving unit 16 is not used in the similar sentence retrieval by the similar English sentence retrieving unit 18. However, it can be used in the similar sentence retrieval by the similar English sentence retrieving unit 18 for retrieving English sentences more accurately reflecting the similarity to the received Japanese sentence.

Specifically, for using the sum of values of the extended mutual information (degree of importance), each of a', b' and c' in the above-described expression (7) in the algorithm [S01]-[S04] in Step S10 may be the sum of the values of the extended mutual information of each pair data identifier retrieved by the similar Japanese sentence retrieving unit 16 instead of the number of documents.

This embodiment obtains similar English sentences based on the received Japanese sentence. Further, according to the present invention, it is possible to divide the received Japanese sentence into phrases and/or words independent of each other by a syntax analysis to obtain similar English sentences based on each of the phrases or words. Thereby the retrieval reflects the meaning of the received Japanese sentence more accurately. In this case, the processes in the above Step S1 to Step S14 are applied to each phrase or word, and thereby the sum of values of the extended mutual information of each pair data identifier obtained by the similar English sentence retrieving unit 18 is regarded as a final value. The similar English sentences can be output in the descending order of the sum values as a result of retrieval.

FIG. 6 shows a result of retrieving English sentences similar in meaning to the received Japanese sentence "雲が立ち込めてき た。 (roughly means "Clouds formed in the sky".)" by the above embodiment of the cross-lingual retrieval system using 360,000 pairs each having a Japanese sentence and an English sentence having the same meaning. These 7 sentences are extracted from 20 sentences of higher ranks in the result of retrieval by being determined adequate to be referred to for translating "雲が立ち込めてき た。" into English. The numeral following each sentence indicates what rank the sentence takes in the result of retrieval. For example, the sentence "Clouds blanketed the sky" has ninth higher similarity in 360,000 English sentences in the object of retrieval.

By applying the morphological analysis to the sentence "雲が立ち込めてき た。", the Japanese content words "雲" and "立ち込める" are obtained. However, like this example, if there is no Japanese sentence containing both "雲" and "立ち込める" in 360,000 sentences,[Related Art 1] cannot obtain any adequate result of retrieval. In fact, the word "立ち込める" does not exist in the bracketed Japanese sentences in FIG. 6, and therefore, [Related Art 1] cannot obtain these adequate translations.

The English word corresponding to "雲" is "cloud" and the English word or phrase corresponding to "立ち込める" is "hang over", "envelop", "shroud" and "screen". Like this example, if there is no English sentence containing both "cloud" and any of "hang over", "envelop", "shroud" and "screen" in 360,000 sentences, [Related Art 2] cannot obtain any adequate result of retrieval. In fact, any of the word or phrase "hang over", "envelop", "shroud" and "screen" does not exist in the English sentences shown in FIG. 6, and therefore, [Related Art 2] cannot obtain these adequate translations.

In a similar way, FIG. 7 shows a result of retrieval of the English sentences similar in meaning to the received Japanese sentence "本名を伏せておくことにした。(roughly means "He decided to veil his name".)". As shown in the example, 5 English sentences are obtained as adequate translations.

Like this example, if no Japanese sentence containing both content words "本名" and "伏せる" extracted from the sentence "本名を伏せておくこと伏せる" exists in the set of sentences to be the object of retrieval, there is no English sentence containing either English phrase "real name" or word "autonym" corresponding to "本名" and any of "hide", "conceal" and "keep secret" corresponding to "伏せる" simultaneously. Consequently, neither [Related Art 1] nor [Related Art 2] can retrieve these proper English sentences.

FIG. 8 shows a result of retrieval performed by the cross-lingual retrieval system of the present invention and a result of retrieval by [Related Art 1] under the same conditions.

The retrieval is performed based on 20 received Japanese sentences in the left columns, and the number of adequate translations included in highly ranked 20 sentences in the result is shown for each of the system of the present invention and [Related art 1]. The cross-lingual retrieval system of the present invention can retrieve adequate translation sentences more than three times as many as the sentences retrieved by [Related Art 1] as a whole.

The present invention can provide adequate translations that have been unavailable as results of retrieval by the conventional related arts to the user.

What is claimed is:

1. A cross-lingual retrieval system comprising:

pair data storing means for storing a plurality of pair data each having a first language sentence and a second language sentence having the same meaning;

query receiving means for receiving a query written in the first language;

first retrieving means for retrieving first language sentences similar to the query from among a set of the first language sentences stored in the pair data storing means; and second retrieving means for retrieving second language sentences similar to second language sentences paired with the respective first language sentences retrieved by the first retrieving means from among a set of the second language sentences stored in the pair data storing means;

wherein the second retrieving means determines and extracts important words from each of second language sentences having the same meaning and paired with the respective first language sentences retrieved by the first retrieving means, provides a degree of importance to each of the important words and retrieves similar second language sentences using the important words and their degree of importance, wherein, for the set A of the second language sentences stored in the pair data storing means, a set B of the second language sentences having the same meaning and paired with the respective first language sentences retrieved by the first retrieving means and a set C of all words appearing in the set B, a first value that is the number of sentences included in the set B, a second value that is the number of sentences in the set B for each important word candidate containing the important word candidate, supposing that all the words in the set C are the important word candidates, and a third value that is the number of sentences in the set A for each important word candidate containing the important word candidate are computed, and the degree of importance of each important word candidate is obtained using the first, second and third values as variables to determine the important word from among the important word candidates based on the degree of importance; and retrieving means takes one of the following values as the degree of importance of each important word candidate:

extended mutual information=$\log_2\{(M\beta)/(\alpha\gamma)\}$;

extended t-score=$M\{(M\beta-\alpha\gamma)/(\alpha\gamma)\}$; and extended Dice-coefficient=$2\beta/(\alpha+\gamma)$, wherein the number of sentences included in the set A is referred to as M, the first value is referred to as $\alpha$, the second value for each important word candidate is referred to as $\beta$ and the third value for each important word candidate is referred to as $\gamma$.

2. The cross-lingual retrieval system as set forth in claim 1, further comprising:

sentence storing means for storing another set of second language sentences, wherein the second retrieving means retrieves second language sentences similar to second language sentences having the same meaning and paired with the respective first language sentences retrieved by the first retrieving means from the set of second language sentences stored in the pair data storing means and the other set of second language sentences stored in the sentence storing means.

3. The cross-lingual retrieval system as set forth in claim 2, wherein the second retrieving means determines and extracts important words from each of second language sentences having the same meaning and paired with the respective first language sentences retrieved by the first retrieving means, provides a degree of importance to each of the important words and retrieves similar second language sentences using the important words and their degree of importance, wherein, for the set A of the second language sentences stored in the pair data storing means and the other set of the second language sentences stored in the sentence storing means, a set B of the second language sentences paired with the respective first language sentences retrieved by the first retrieving means and a set C of all words appearing in the set B, a first value that is the number of sentences included in the set B, a second value that is the number of sentences in the set B for each important word candidate containing the important word candidate, supposing that all the words in the set C are the important word candidates, and a third value that is the number of sentences in the set A for each important word candidate containing the important word candidate are computed, and the degree of importance of each important word candidate is obtained using the first, second and third values as variables to determine the important word from among the important word candidates based on the degree of importance.

4. The cross-lingual retrieval system as set forth in claim 1, wherein the second retrieving means extracts important words based on a predetermined reference from each of second language sentences paired with the respective first language sentences retrieved by the first retrieving means, and retrieves similar second language sentences using the important words.

5. The cross-lingual retrieval system as set forth in claim 1, wherein the second retrieving means uses a vector space model for retrieving second language sentences similar to second language sentences paired with the respective first language sentences retrieved by the first retrieving means.

6. The cross-lingual retrieval system as set forth in claim 1, wherein the first retrieving means retrieves first language sentences similar to the query and provides a degree of importance to each of the retrieved first language sentences and the second retrieving means retrieves second language sentences similar to second language sentences paired with the respective first language sentences retrieved by the first retrieving means using the provided degree of importance.

7. The cross-lingual retrieval system as set forth in claim 1, wherein the query receiving means divides the query into a plurality of words and/or phrases, the first retrieving means retrieves first language sentences similar to the query using each of the divided words and/or phrases, and the second retrieving means retrieves, based on each of the words and/or phrases, second language sentences similar to second language sentences paired with the respective first language sentences retrieved by the first retrieving means, and further comprising result merging means for selecting second language sentences as a result of retrieval in accordance with a predetermined degree of importance from among the second language sentences retrieved by the second retrieving means.

8. The cross-lingual retrieval system as set forth in claim 1, wherein the second retrieving means also obtains the first language sentences retrieved by the first retrieving means with second language sentences paired therewith for retrieving plural pair data similar to the pair data comprising the obtained first language sentences and second language sentences from among the set of pair data stored in the pair data storing means.

9. A storage medium readable by a computer, storing a program of instructions executable by the computer to perform cross-lingual retrieval, the instructions comprising the steps of:

receiving a query written in a first language;

firstly retrieving first language sentences similar to the query from a set of first language sentences in a plurality of pair data each having a first language sentence and a second language sentence having the same meaning stored in a memory area; and secondly retrieving second language sentences similar to second language sentences paired with the respective first language sentences retrieved by the first retrieval from among the set of the second language sentences in the plurality of pair data;

wherein the second retrieval of second language sentences comprises the steps of:

determining and extracting important words from each of second language sentences having the same meaning and paired with the respective first language sentences retrieved by the first retrieval of first language sentences, provides a degree of importance to each of the important words and retrieves similar second language sentences using the important words and their degree of importance, wherein, for the set A of the second language sentences stored in the pair data storing means, a set B of the second language sentences having the same meaning and paired with the respective first language sentences retrieved by the first retrieval of first language sentences and a set C of all words appearing in the set B, a first value that is the number of sentences included in the set B, a second value that is the number of sentences in the set B for each important word candidate containing the important word candidate, supposing that all the words in the set C are the important word candidates, and a third value that is the number of sentences in the set A for each important word candidate containing the important word candidate are computed, and the degree of importance of each important word candidate is obtained using the first, second and third values as variables to determine the important word from among the important word candidates based on the degree of importance; and retrieval of second language sentences takes one of the following values as the degree of importance of each important word candidate:

extended mutual information=$\log_2\{(M\beta)/(\alpha\gamma)\}$;
extended t-score=$M\{(M\beta-\alpha\gamma)/(\alpha\gamma)\}$; and
extended Dice-coefficient=$2\beta(\alpha+\gamma)$, wherein the number of sentences included in the set A is referred to as M, the first value is referred to as $\alpha$, the second value for each important word candidate is referred to as $\beta$ and the third value for each important word candidate is referred to as $\gamma$.

10. The storage medium as set forth in claim 9, wherein the step of secondly retrieving retrieves second language sentences similar to second language sentences paired with the respective first language sentences retrieved by the firstly retrieving from among the set of the second language sentences in the plurality of pair data and another set of second language sentences stored in a second memory area separately to the plurality of pair data.

11. The storage medium as set forth in claim 9, the instructions of the program further comprising the step of:

reading the plurality of pair data from the storage medium and storing it in a memory of the computer.

12. A method of cross-lingual retrieval, comprising the steps of:

receiving a query written in a first language;

firstly retrieving first language sentences similar to the query from among a set of first language sentences in a plurality of pair data each having a first language sentence and a second language sentence having the same meaning; and secondly retrieving second language sentences similar to second language sentences paired with the respective first language sentences retrieved by the first retrieving from among a set of second language sentences in the plurality of pair data;

wherein the second retrieval of second language sentences comprises the steps of:

determining and extracting important words from each of second language sentences having the same meaning and paired with the respective first language sentences retrieved by the first retrieval of first language sentences, provides a degree of importance to each of the important words and retrieves similar second language sentences using the important words and their degree of importance, wherein, for the set A of the other second language sentences stored in the pair data storing means, a set B of the second language sentences having the same meaning and a set C of all words appearing in the set B, a first value that is the number of sentences included in the set B, a second value that is the number of sentences in the set B for each important word candidate containing the important word candidate, supposing that all the words in the set C are the important word candidates, and a third value that is the number of sentences in the set A for each important word candidate containing the important word candidate are computed, and the degree of importance of each important word candidate is obtained using the first, second and third values as variables to determine the important word from among the important word candidates based on the degree of importance; and retrieval of second language sentences takes one of the following values as the degree of importance of each important word candidate:

extended mutual information=$\log_2\{(M\beta)/(\alpha\gamma)\}$;
extended t-score=$M\{(M\beta-\alpha\gamma)/(\alpha\gamma)\}$; and
extended Dice-coefficient=$2\beta/(\alpha+\gamma)$, wherein the number of sentences included in the set A is referred to as M, the first value is referred to as $\alpha$, the second value for each important word candidate is referred to as $\beta$ and the third value for each important word candidate is referred to as $\gamma$.

13. The method of cross-lingual retrieval as set forth in claim 12, wherein the step of secondly retrieving retrieves second language sentences similar to second language sentences paired with the respective first language sentences retrieved by the firstly retrieving from among the set of second language sentences in the plurality of pair data and another set of second language sentences separately provided.

14. A cross-lingual retrieval system comprising:

pair data storing means for storing a plurality of pair data each having a first language sentence and a second language sentence having the same meaning;

sentence storing means for storing another set of second language sentences;

query receiving means for receiving a query written in the first language;

first retrieving means for retrieving first language sentences similar to the query from among a set of the first language sentences stored in the pair data storing means; and second retrieving means for retrieving second language sentences similar to second language sentences paired with the respective first language sentences retrieved by the first retrieving means from among the other set of the second language sentences stored in the sentence storing means;

wherein the second retrieving of second language sentences comprises the steps of:

determining and extracting important words from each of second language sentences having the same meaning and paired with the respective first language sentences retrieved by the first retrieval of first language sentences, provides a degree of importance to each of the important words and retrieves similar second language sentences using the important words and their degree of importance, wherein, for the set A of the other second language sentences stored in the pair data storing means, a set B of the other second language sentences having the same meaning and a set C of all words appearing in the set B, a first value that is the number of sentences included in the set B, a second value that is the number of sentences in the set B for each important word candidate containing the important word candidate, supposing that all the words in the set C are the important word candidates, and a third value that is the number of sentences in the set A for each important word candidate containing the important word candidate are computed, and the degree of importance of each important word candidate is obtained using the first, second and third values as variables to determine the important word from among the important word candidates based on the degree of importance; and retrieval of second language sentences takes one of the following values as the degree of importance of each important word candidate:

extended mutual information=$\log_2\{(M\beta)/(\alpha\gamma)\}$;
extended t-score=$M\{(M\beta-\alpha\gamma)/(\alpha\gamma)\}$; and
extended Dice-coefficient=$2\beta/(\alpha+\gamma)$, wherein the number of sentences included in the set A is referred to as M, the first value is referred to as $\alpha$, the second value for each important word candidate is referred to as $\beta$ and the third value for each important word candidate is referred to as $\gamma$.

15. A storage medium readable by a computer, storing a program of instructions executable by the computer to perform cross-lingual retrieval, the instructions comprising the steps of:

receiving a query written in a first language;

firstly retrieving first language sentences similar to the query from a set of first language sentences in a plurality of pair data each having a first language sentence and a second language sentence having the same meaning stored in a first memory area; and secondly retrieving second language sentences similar to second language sentences paired with the respective first language sentences retrieved by the first retrieval from among another set of second language sentences stored in a second memory area separately to the plurality of pair data;

wherein the second retrieval of second language sentences comprises the steps of:

determining and extracting important words from each of second language sentences having the same meaning and paired with the respective first language sentences retrieved by the first retrieval of first language sentences, provides a degree of importance to each of the important words and retrieves similar second language sentences using the important words and their degree of importance, wherein, for the set A of the other second language sentences stored in the pair data storing means, a set B of the other second language sentences having the same meaning and a set C of all words appearing in the set B, a first value that is the number of sentences included in the set B, a second value that is the number of sentences in the set B for each important word candidate containing the important word candidate, supposing that all the words in the set C are the important word candidates, and a third value that is the number of sentences in the set A for each important word candidate containing the important word candidate are computed, and the degree of importance of each important word candidate is obtained using the first, second and third values as variables to determine the important word from among the important word candidates based on the degree of importance; and retrieval of second language sentences takes one of the following values as the degree of importance of each important word candidate:

extended mutual information=$\log_2\{(M\beta)/(\alpha\gamma)\}$;
extended t-score=$M\{(M\beta-\alpha\gamma)/(\alpha\gamma)\}$; and
extended Dice-coefficient=$2\beta/(\alpha+\gamma)$, wherein the number of sentences included in the set A is referred to as M, the first value is referred to as $\alpha$, the second value for each important word candidate is referred to as $\beta$ and the third value for each important word candidate is referred to as $\gamma$.

16. A method of cross-lingual retrieval, comprising the steps of:

receiving a query written in a first language;

firstly retrieving first language sentences similar to the query from among a set of first language sentences in a plurality of pair data each having a first language sentence and a second language sentence having the same meaning; and secondly retrieving second language sentences similar to second language sentences paired with the respective first language sentences retrieved by the firstly retrieving from among another set of second language sentences provided separately to the plurality of pair data;

wherein the second retrieval of second language sentences comprises the steps of:

determining and extracting important words from each of second language sentences having the same meaning and paired with the respective first language sentences retrieved by the first retrieval of first language sentences, provides a degree of importance to each of the important words and retrieves similar second language sentences using the important words and their degree of importance, wherein, for the set A of the other second language sentences stored in the pair data storing means, a set B of the second language sentences having the same meaning and a set C of all words appearing in the set B, a first value that is the number of sentences included in the set B, a second value that is the number of sentences in the set B for each important word candidate containing the important word candidate, supposing that all the words in the set C are the important word candidates, and a third value that is the number of sentences in the set A for each important word candidate containing the important word candidate are computed, and the degree of importance of each important word candidate is obtained using the first, second and third values as variables to determine the important word from among the important word candidates based on the degree of importance; and retrieval of second language sentences takes one of the following values as the degree of importance of each important word candidate:

extended mutual information=$\log_2\{(M\beta)/(\alpha\gamma)\}$;

extended t-score=$M\{(M\beta-\alpha\gamma)/(\alpha\gamma)\}$; and extended Dice-coefficient=$2\beta/(\alpha+\gamma)$, wherein the number of sentences included in the set A is referred to as M, the first value is referred to as $\alpha$, the second value for each important word candidate is referred to as $\beta$ and the third value for each important word candidate is referred to as $\gamma$.

\* \* \* \* \*